(12) United States Patent
Tokumoto

(10) Patent No.: US 11,843,737 B2
(45) Date of Patent: Dec. 12, 2023

(54) INFORMATION PROCESSING APPARATUS, CONTROL METHOD THEREFOR, AND STORAGE MEDIUM

(71) Applicant: CANON KABUSHIKI KAISHA, Tokyo (JP)

(72) Inventor: Hirokazu Tokumoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/821,392

(22) Filed: Aug. 22, 2022

(65) Prior Publication Data

US 2023/0068631 A1   Mar. 2, 2023

(30) Foreign Application Priority Data

Aug. 30, 2021   (JP) .................. 2021-139941

(51) Int. Cl.
  *G06K 15/02*   (2006.01)
  *H04N 1/00*   (2006.01)

(52) U.S. Cl.
  CPC ..... *H04N 1/00503* (2013.01); *H04N 1/00217* (2013.01)

(58) Field of Classification Search
  CPC .................. H04N 1/00503; H04N 1/00217
  See application file for complete search history.

(56) References Cited

FOREIGN PATENT DOCUMENTS

| JP | 2010067208 A | * | 3/2010 |
| JP | 2010267075 A | * | 11/2010 |
| JP | 2019-061389 A | | 4/2019 |

* cited by examiner

*Primary Examiner* — Moustapha Diaby
(74) *Attorney, Agent, or Firm* — Canon U.S.A., Inc. IP Division

(57) ABSTRACT

If a new web engine is installed on an information processing apparatus to introduce the information processing apparatus to new web technology, display compatibility between the new web engine and a conventional web engine that has been used cannot be maintained, which leads to a degradation in usability. According to embodiments of the present disclosure, an information processing apparatus includes a plurality of web engines and the web engines to be used are dynamically changed based on a content of a request.

14 Claims, 8 Drawing Sheets

FIG.6A

| | JOB NAME | COLOR | | NUMBER OF COPIES |
|---|---|---|---|---|
| ✓ | index.html | AUTO | ▼ | 3 |
| ☐ | Meeting.docx | BW | ▼ | 1 |
| | | CL | | |
| | | AUTO | | |

PRINT QUEUE DISPLAY — 600
SATO IS LOGGED IN — 610
611 — JOB NAME, 612 — COLOR, 614 — NUMBER OF COPIES
615 — ✓ row, 616 — ☐ row
617 PRINT, 618 DELETE, 619 CANCEL

FIG.6B

| | JOB NAME | COLOR | NUMBER OF COPIES |
|---|---|---|---|
| ✓ | index.html | AUTO | 3 |
| ☐ | Meeting.docx | BW | 1 |
| | | CL | |
| | | AUTO | |

PRINT QUEUE DISPLAY — 620
SATO IS LOGGED IN
621 — JOB NAME, 622 — COLOR, 624 — NUMBER OF COPIES
625, 626
627 PRINT, 628 DELETE, 629 CANCEL

FIG.6C

```
<input type="checkbox" name="printjob" value="1" checked="checked"> index.html
<input type="checkbox" name="printjob" value="2"> Meeting.docx
```
~630

FIG.6D

```
<select style="width: 200px; height: 50px;">
    <option value=0> BW    </option>
    <option value=1> CL    </option>
    <option value=2> AUTO </option>
</select>
```
~640

FIG.6E

| NEW PRINT APPLICATION ~650 | SATO IS LOGGED IN |

EXECUTE ALL PRINT JOBS AT ONCE   NUMBER OF JOBS: 2 ~651

DISPLAY LIST OF PRINT JOBS ~652

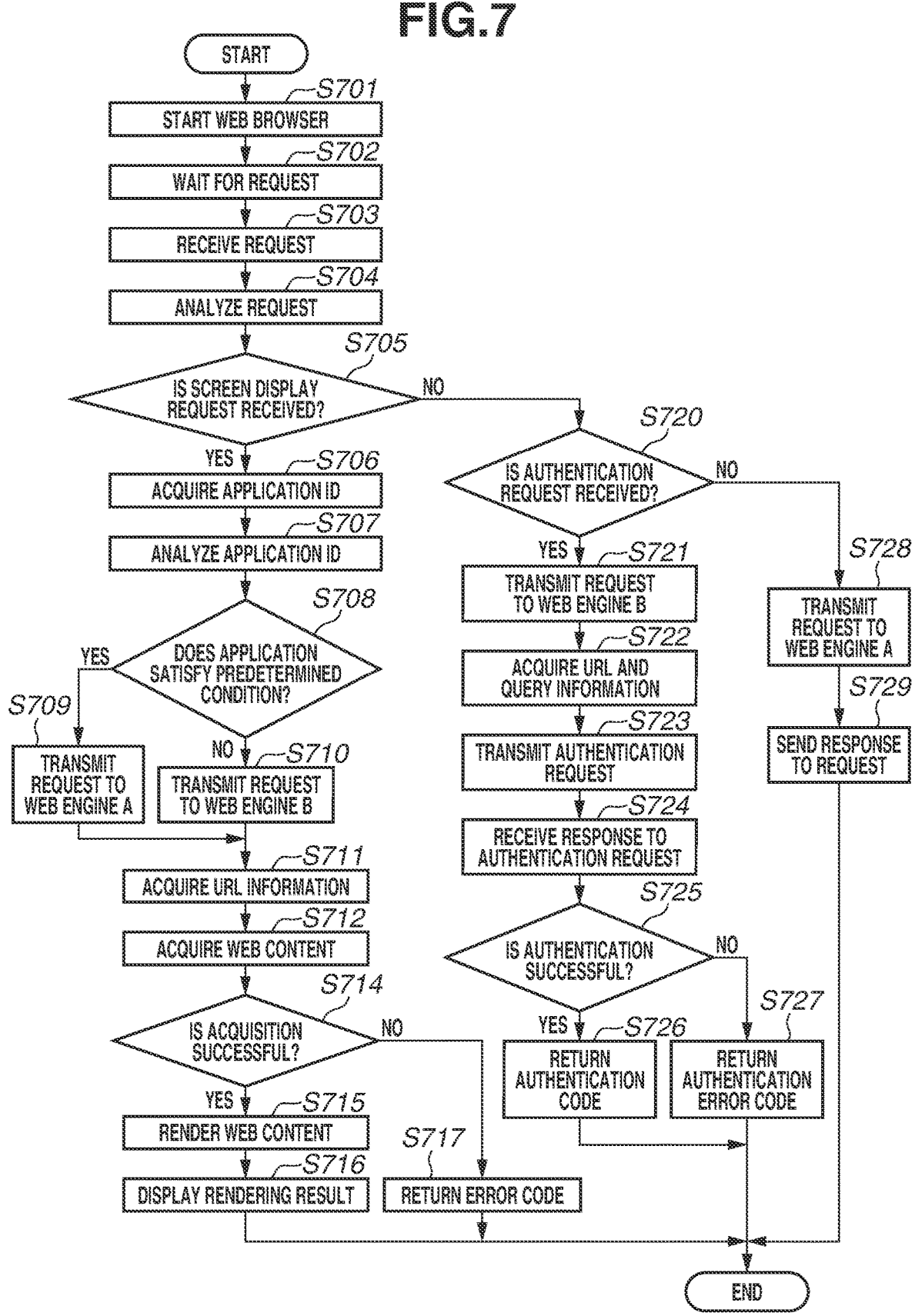

INFORMATION PROCESSING APPARATUS, CONTROL METHOD THEREFOR, AND STORAGE MEDIUM

BACKGROUND

Field of the Disclosure

The present disclosure relates to an information processing apparatus including a web browser, a control method for the information processing apparatus, and a storage medium.

Description of the Related Art

Some information processing apparatuses, such as a multifunction peripheral (MFP), include a web browser function for browsing a web page. To display a web page on a web browser, rendering a Hypertext Markup Language (HTML) and Cascading Style Sheets (CSS) and executing JavaScript® are performed. This operation is executed by the web browser using a group of engines (hereinafter referred to as a web engine) including an HTML rendering engine.

Many web engines are developed as open source software (OSS), and users can use various types and versions of web engines. Under current circumstances, many MFP vendors provide information apparatuses equipped with web browsers using web engines developed as OSS. Japanese Patent Application Laid-Open No. 2019-61389 discusses a technique for displaying a web content on a web browser and executing a script if the web content is received from a server including an authentication function.

When the web engines that have been installed and conventionally used in an information processing apparatus do not support new web technology, installation of a new web engine may be required. However, if a new web engine is introduced and the new web engine is uniformly implemented, for example, display compatibility between the new web engine and the other web engines that have been installed and conventionally used cannot be maintained and a web content may be displayed in a different way, which can confuse the user who has used the information processing apparatus.

SUMMARY

Embodiments of the present disclosure are directed to providing a method for preventing a degradation in usability even in a case where a new web engine is installed on an apparatus.

According to embodiments of the present disclosure, an information processing apparatus including a web browser that is configured to operate on the information processing apparatus and includes a plurality of web engines, the information processing apparatus includes a memory, and at least one processor in communication with the memory, wherein the at least one processor of the information processing apparatus is configured to perform receiving a request for processing on the web browser, and determining which one of the plurality of web engines is to be used to execute the processing, based on a content of request information corresponding to the received request.

Further features of the present disclosure will become apparent from the following description of exemplary embodiments with reference to the attached drawings.

BRIEF DESCRIPTION OF THE DRAWINGS

FIGS. 6A, 6B, and 6E are diagrams each illustrating an example of a screen for a print application, and FIGS. 6C and 6D are diagrams each illustrating a part of a screen content.

FIG. 7 is a flowchart illustrating processing that is executed by the image forming apparatus.

DESCRIPTION OF THE EMBODIMENTS

Modes for carrying out embodiments of the present disclosure will be described below with reference to the drawings. The following exemplary embodiments are not intended to limit the disclosure, and not all combinations of features described in the exemplary embodiments are essential to solving means of the disclosure. In the following exemplary embodiments, an image forming apparatus is used as an example of an information processing apparatus. However, the present disclosure is not limited only to this example.

<System Network Configuration>

Figure 1:
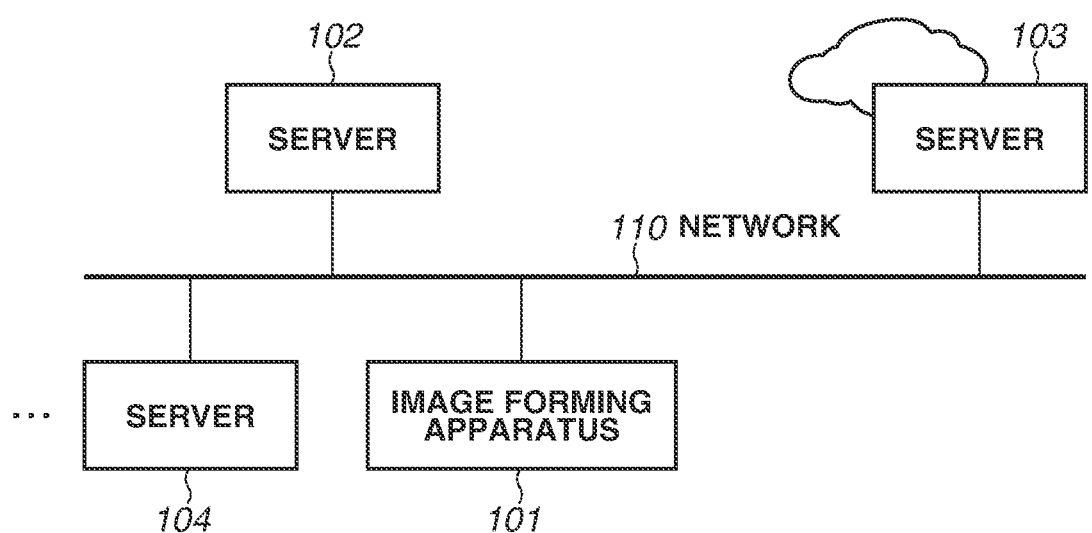
FIG. 1 is a network configuration diagram according to an exemplary embodiment of the present disclosure.

FIG. 1 is a network configuration diagram according to a first exemplary embodiment. An image forming apparatus 101 and servers 102, 103, and 104 are connected to a network 110 so that the image forming apparatus 101 and the servers 102, 103, and 104 can communicate with each other. The servers 102, 103, and 104 are not limited to on-premise servers, but instead can be cloud servers on an external cloud. In the present exemplary embodiment, the server 103 is a cloud server that uses cloud authentication. The present exemplary embodiment illustrates the above-described configuration example as an example of a network configuration. However, the present disclosure is not limited to this example. Any apparatus other than the above-described apparatuses can also be connected to the network 110. The connection to the network 110 can be established via a wired connection or a wireless connection.

<Hardware Configuration of Image Forming Apparatus>

Figure 2:
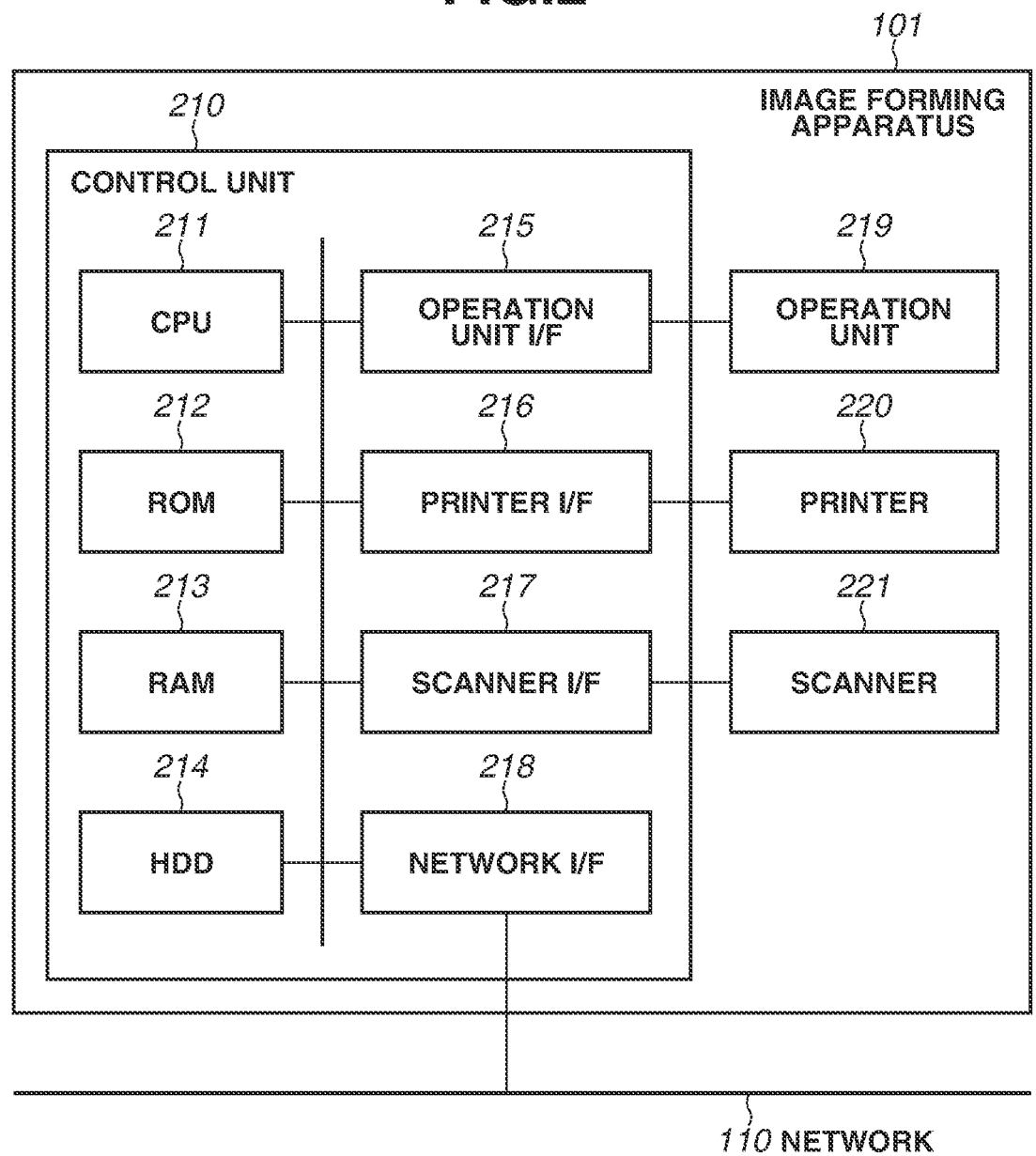
FIG. 2 is a block diagram illustrating a configuration example of an image forming apparatus according to the exemplary embodiment.

FIG. 2 is a block diagram illustrating a hardware configuration example of the image forming apparatus 101. A control unit 210 including a central processing unit (CPU) 211 controls overall operation of the image forming apparatus 101. The CPU 211 reads out control programs stored in a read-only memory (ROM) 212 and executes various control processing, such as reading control processing and transmission control processing. A random access memory (RAM) 213 is used as a temporary storage area, such as a main memory, or a work area for the CPU 211. A hard disk drive (HDD) 214 stores image data and various programs.

An operation unit interface (I/F) 215 connects an operation unit 219 to the control unit 210. The operation unit 219 is provided with a liquid crystal display unit including a touch panel function, a keyboard, and the like.

A printer I/F 216 connects a printer 220 to the control unit 210. Image data to be printed by the printer 220 is transferred from the control unit 210 to the printer 220 via the printer I/F 216 and is printed on a print medium by the printer 220.

A scanner I/F 217 connects a scanner 221 to the control unit 210. The scanner 221 scans an image on a document to generate image data and outputs the generated image data to the control unit 210 via the scanner I/F 217.

A network I/F 218 connects the control unit 210 to the network 110. When a user designates a uniform resource locator (URL) address of the server 102 to be accessed by the user on a web browser of the image forming apparatus 101, the network I/F 218 transmits a request for an external apparatus (server 102 in this case) on the network 110. In response to the request, the server 102 returns a response with a corresponding web content to the web browser. The response with the corresponding web content is generally described using a Hypertext Markup Language (HTML) and Cascading Style Sheets (CSS), JavaScript®, or the like. The web browser renders the web content acquired from the server 102 (this processing is generally referred to as browser rendering processing or the like). The web browser displays the rendering result on the liquid crystal display unit.

<Software Configuration of Image Forming Apparatus>

Figure 3:
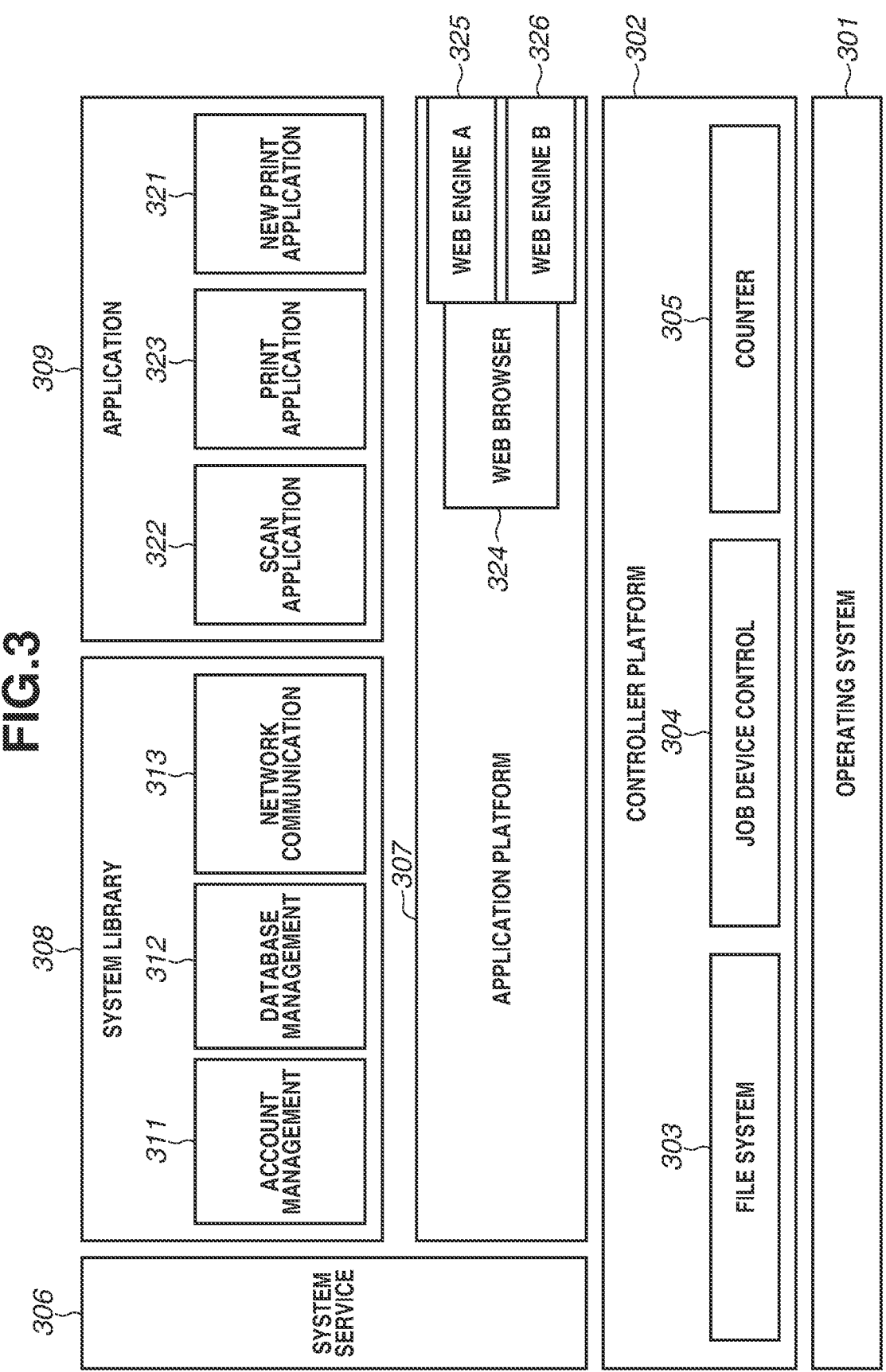
FIG. 3 is a block diagram illustrating a software configuration example of the image forming apparatus.

FIG. 3 is a block diagram illustrating an overall software configuration that is implemented by the CPU 211 executing control programs stored in the ROM 212 of the image forming apparatus 101.

An operating system 301 provides services and frameworks, for various types of resource management optimized for control of an embedded system, for software that runs on the services and frameworks. The services and frameworks for resource management provided by the operating system 301 include multi-task management in which the CPU 211 manages a plurality of execution contexts of processing to cause a plurality of processing to operate substantially in parallel, and inter-task communication for implementing synchronization between tasks and data exchange. The operating system 301 also provides, for example, a protocol stack in which processing for various protocols, such as memory management, interrupt management, various device drivers, local interfaces, networks, and communication, is implemented.

A controller platform 302 includes a file system 303, a job device control 304, and a counter 305. The file system 303 is a system for storing data constructed on a storage device, such as the HDD 214 or the RAM 213, and is used to spool jobs to be handled by the control unit 210 and to store various data. The job device control 304 controls hardware for a multifunction peripheral (MFP) or the printer 220, and controls jobs using basic functions (a print function, a scan function, a communication function, an image conversion function, etc.) mainly provided by the hardware. The counter 305 manages an expiration date of each application and a counter value based on utilization records of the print and scan functions.

A system service 306 is a module for monitoring an operating status of the MFP or the printer 220 and downloading software or licenses from a software distribution server via the network 110.

An application platform 307 is middleware that enables use of the system of each of the operating system 301, the controller platform 302, and a web browser 324 from a system library 308 or an application 309 to be described below.

The web browser 324 is an example of the application platform 307. The web browser 324 provides functions for receiving a request from the application 309, acquiring a web content held in the corresponding server, rendering a web content, displaying information on the operation unit 219, and sending an authentication request to the corresponding server. A group of engines, including an HTML rendering engine, that is used by the web browser is hereinafter referred to as a web engine.

A web engine A 325 and a web engine B 326 are examples of the application platform 307, and provide functions for rendering a web content in response to an execution request from the web browser 324, communicating with the corresponding server, and performing authentication processing and the like. In the present exemplary embodiment, the web browser 324 includes the web engine A 325 and the web engine B 326. However, the configuration of the web browser 324 is not limited to this configuration. The web browser 324 can include any web engine other than the web engine A 325 and the web engine B 326, and a web browser that uses a web engine different from the web engine A 325 and the web engine B 326 can be provided separately from the web browser 324.

The system library 308 is a software module that provides a function for providing services that can be used from the application 309, and includes an account management 311, a database management 312, and a network communication 313.

The application 309 is a software module configured to display a screen on the operation unit 219 and receive an input from the user, and provides the user with various functions included in the image forming apparatus 101.

A scan application 322 is an example of the application 309. The scan application 322 provides functions for accessing the job device control 304 via the application platform 307, scanning a paper document, and converting the scanned data into electronic data.

A print application 323 is an example of the application 309. The print application 323 provides functions for accessing the job device control 304 via the application platform 307, storing print jobs into the HDD 214, and executing printing based on the stored print jobs. A screen for the print application 323 is displayed on the web browser 324.

A new print application 321 is an example of the application 309. The new print application 321 provides functions for accessing the job device control 304 via the application platform 307 and executing print jobs. The new print application 321 is released later than the print application 323 and is more sophisticated than the print application 323. A screen for the new print application 321 is displayed on the web browser 324. The new print application 321 is an application for displaying a web content using web technology that is upgraded from web technology used for the print application 323.

The application 309 can also include applications other than the above-described applications.

<Software Configuration of Web Browser>

Figure 4:
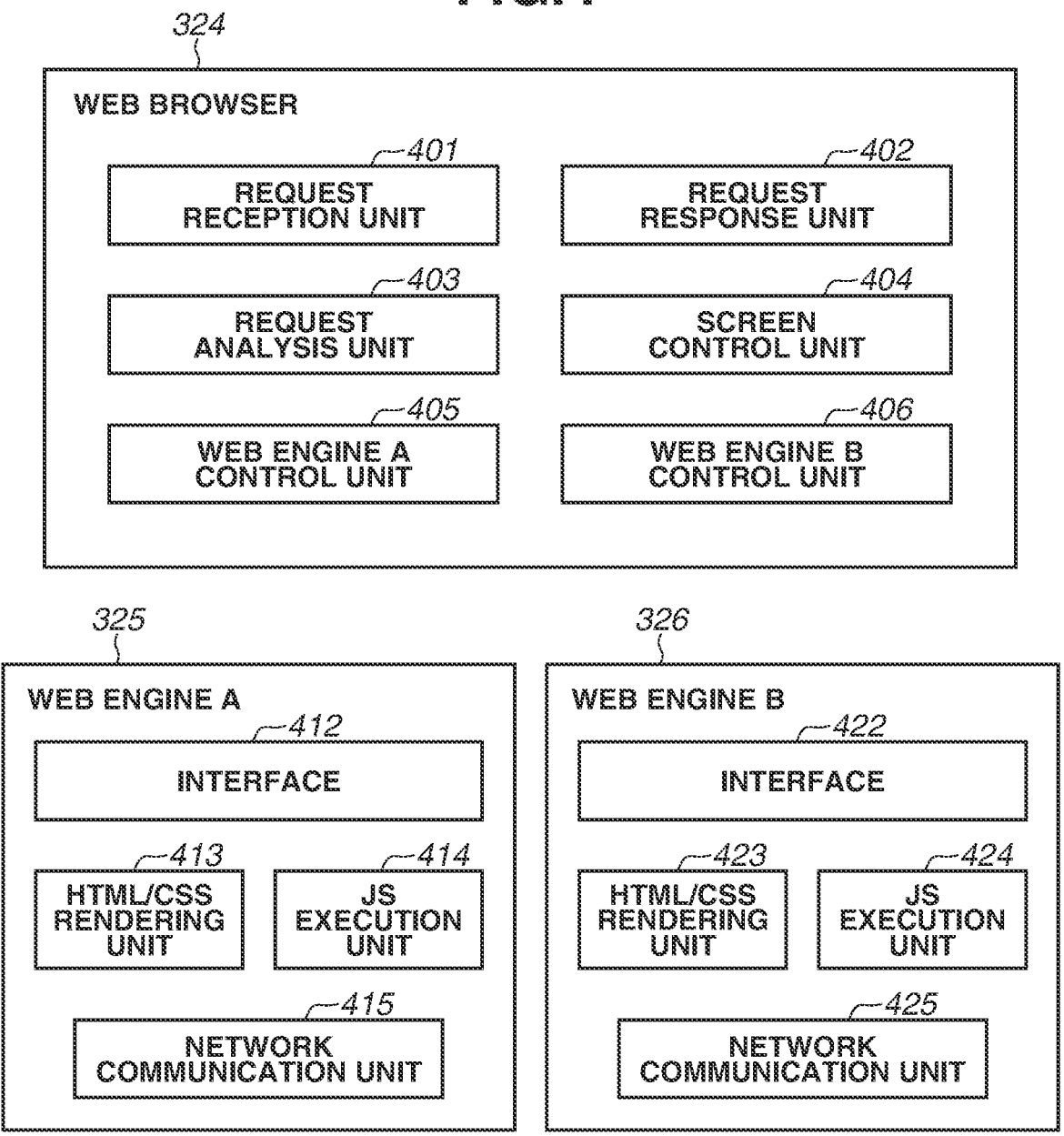
FIG. 4 is a block diagram illustrating a software configuration example of a web browser.

FIG. 4 is a block diagram illustrating a software configuration example of the web browser 324 that is implemented by the CPU 211 executing control programs stored in the ROM 212 or the like of the image forming apparatus 101.

The web browser 324 includes a request reception unit 401, a request response unit 402, a request analysis unit 403, a screen control unit 404, a web engine A control unit 405, and a web engine B control unit 406.

The web engine A 325 includes an interface 412, an HTML/CSS rendering unit 413, a JavaScript® (JS) execution unit 414, and a network communication unit 415. The web engine B 326 includes an interface 422, an HTML/CSS rendering unit 423, a JS execution unit 424, and a network communication unit 425.

The web engine A 325 is a web engine developed earlier than the web engine B 326 and has been conventionally installed on the image forming apparatus 101. On the other hand, the web engine B 326 is a web engine developed later than the web engine A 325 and supporting new versions of HTML/CSS and JavaScript®, and thus, the web engine B 326 enables the user to use the latest web technology.

In the present exemplary embodiment, the web browser 324 includes the web engine A 325 and the web engine B 326 that are different versions of web engines of the same type and the version of the web engine B 326 is newer than the version of the web engine A 325 (e.g., the web engine A 325 and the web engine B 326 are different versions of Webkit®).

The web engine A 325 and the web engine B 326 are not limited to different versions of web engines of the same type, but instead can be different types of web engines. The request reception unit 401 receives a request for the web browser 324 from the application 309.

The request response unit 402 causes the web browser 324 to transmit a response to the request to the application 309.

The request analysis unit 403 causes the web browser 324 to analyze the request received from the application 309, determine a web engine to be used, and send a request to the web engine A control unit 405 or the web engine B control unit 406.

The screen control unit 404 controls display of the rendered web content.

The web engine A control unit 405 and the web engine B control unit 406 control the web engine A 325 and the web engine B 326, respectively, in response to a request from the request analysis unit 403.

The interfaces 412 and 422 are interfaces for the web engine A 325 and the web engine B 326, respectively. Each of the web engine A 325 and the web engine B 326 is operated in response to a call for the corresponding interface from the web browser 324.

The HTML/CSS rendering units 413 and 423 render a web content using HTML/CSS as input data, and converts the input data into display data.

The JS execution units 414 and 424 build and execute JavaScript® as input data.

The network communication units 415 and 425 communicate with an external server via the network 110. The network communication units 415 and 425 have the same function as the network communication 313 in the system library 308. However, the network communication units 415 and 425 are exclusively used by the web engine A 325 and the web engine B 326, respectively.

<Top Menu Screen>

Figure 5A:
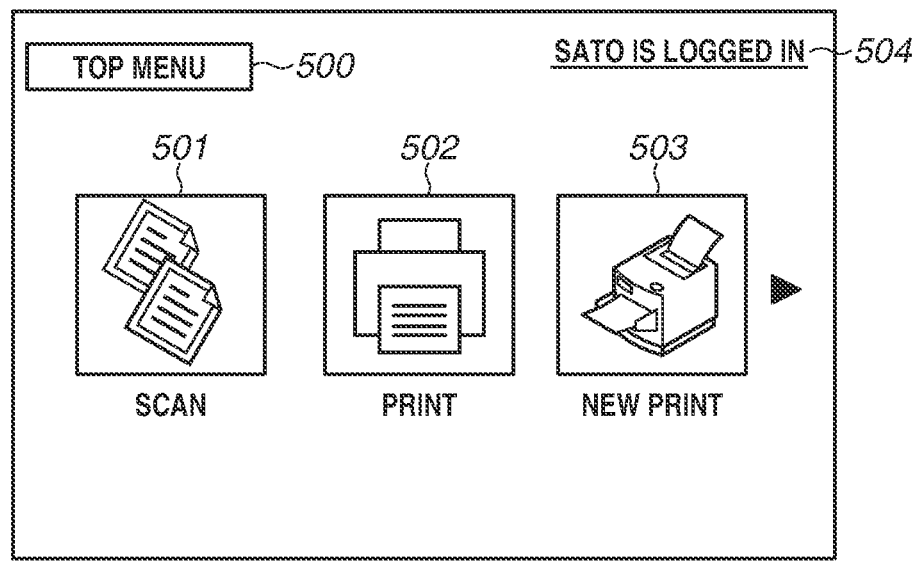
FIGS. 5A to 5C are diagrams each illustrating an example of a screen for a scan application.

FIG. 5A illustrates an example of a top menu screen of the image forming apparatus 101. This screen is displayed on the operation unit 219 of the image forming apparatus 101, and the user selects an icon to execute a desired function on the screen.

The user logs in to the image forming apparatus 101 by user authentication using an integrated circuit (IC) card or the like for the image forming apparatus 101. A top menu screen 500 is displayed after the user has logged in to the image forming apparatus 101, and the user can select an application to be used in the image forming apparatus 101 from the top menu screen 500. Because a state where the user is logged in to the image forming apparatus 101 is illustrated, a login user name 504 is displayed on the screen. As the example case of the present exemplary embodiment, a screen that is displayed when the user with a user name "Sato" is logging in the image forming apparatus 101 is illustrated. The top menu screen 500 is a screen to be displayed based on screen information preliminarily stored in the image forming apparatus 101, and is not displayed on the web browser 324.

Icons corresponding to the application 309 (scan application 322, print application 323, and new print application 321) installed on the image forming apparatus 101 are displayed on the top menu screen 500.

A scan icon 501 is an icon to execute the scan application 322. In response to pressing performed on the scan icon 501, the scan application 322 is started.

A print icon 502 is an icon to execute the print application 323. In response to pressing performed on the print icon 502, the print application 323 is started. A screen for the print application 323 is displayed on the web browser 324.

A new print icon 503 is an icon to execute the new print application 321. In response to pressing performed on the new print icon 503, the new print application 321 is started. A screen for the new print application 321 is displayed on the web browser 324.

<Scan Application Screen>

Figure 5B:
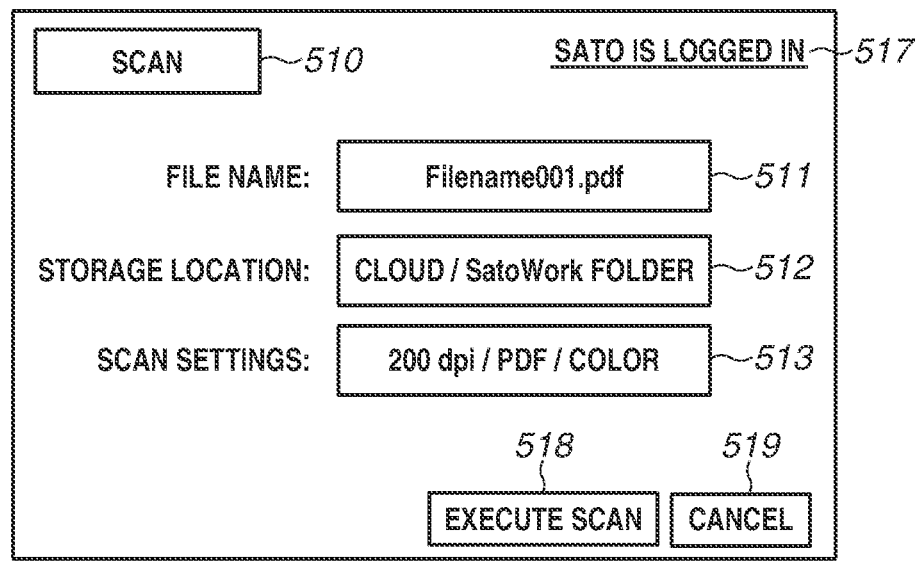

FIG. 5B illustrates a scan execution screen 510 of the scan application 322 that is displayed in response to pressing performed on the scan icon 501. FIG. 5B illustrates an example of a screen that is displayed when the user with the user name "Sato" is logged in. The scan execution screen 510 is a screen that is displayed based on screen information preliminarily stored in the image forming apparatus 101, and is not a screen that is displayed on the web browser 324.

The user sets a document on the scanner 221 and opens the scan execution screen 510 to send a document scan instruction to scan the document. Further, the user can store electronic data generated by scanning into a designated server.

A file name 511 indicates a file name of electronic data generated by converting data on the document scanned by the user. A storage location 512 indicates a storage location of generated electronic data. The HDD 214 in the image forming apparatus 101 can be designated as the storage location, and an external server can also be designated as the storage location. In this case, the server 103 that is on a cloud and uses cloud authentication is designated as the storage location.

Scan settings 513 indicate attribute settings for generated electronic data. The attributes include a resolution, a file format, and a color setting. Each of the file name 511, the storage location 512, and the scan settings 513 can be changed by a user's touch operation performed on the corresponding area.

A scan execution button 518 is a button to execute scanning and storage of image data based on the settings set on the scan execution screen 510. A cancel button 519 is a button to cancel the execution of scanning and return the screen to the top menu screen 500.

Figure 5C:
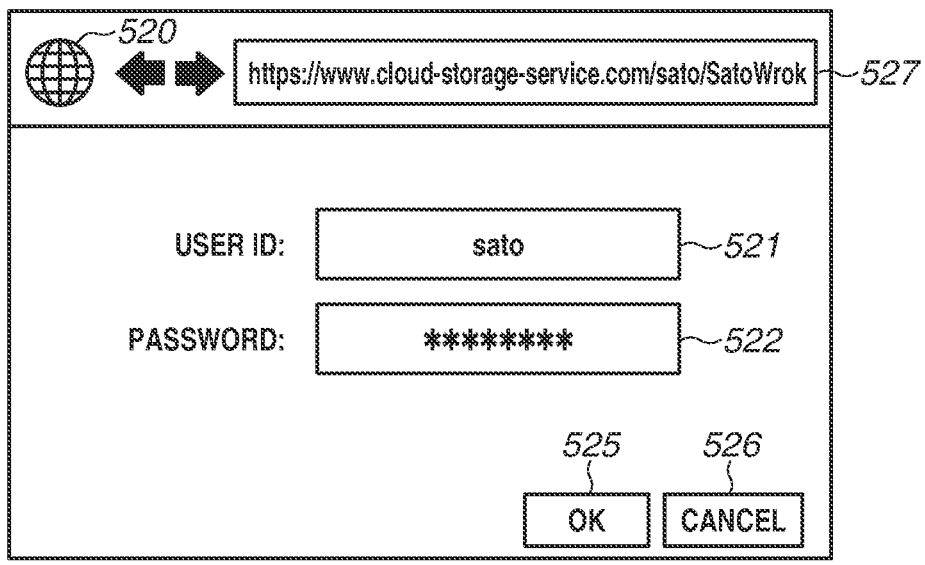

FIG. 5C illustrates a cloud authentication screen 520 to be displayed in response to the user designating, as the storage location 512, the server 103 that uses cloud authentication, and pressing the scan execution button 518.

The cloud authentication screen 520 is displayed by the web browser 324. The cloud authentication screen 520 displays a URL 527 of a cloud authentication destination.

A user identification (ID) 521 is an entry field for a user ID for use in cloud authentication. A password 522 is an entry field for a password for use in the cloud authentication. The user inputs data to each entry field using the operation unit 219.

After the input of the user ID and password is completed, the user presses an OK button 525 to perform the authentication. When the authentication is successful, electronic data is stored into the designated storage location, and then the screen returns to the top menu screen 500.

When a cancel button 526 is pressed, the screen returns to the top menu screen 500 without performing the authentication.

<Cloud Authentication Processing>

Processing in which the web browser 324 that operates on the image forming apparatus 101 according to the present exemplary embodiment performs authentication on the server 103 will be described with reference to a flowchart illustrated in FIG. 7. Each step in the flowchart illustrated in FIG. 7 is executed by the CPU 211 of the image forming apparatus 101 loading control programs stored in a memory, such as the ROM 212, into the RAM 213 and executing the control programs.

In step S701, the web browser 324 is started at power-on of the image forming apparatus 101.

In step S702, the web browser 324 transitions to a standby state to wait for a request from the application 309.

In step S703, the web browser 324 receives a request from the application 309. A description will be given of a case where the user presses the OK button 525 on the cloud authentication screen 520, specifically, a case where an authentication request for the server 103 is received from the scan application 322 that runs on the image forming apparatus 101.

In step S704, the web browser 324 analyzes the request received from the scan application 322. Specifically, the web browser 324 analyzes request information, received from the scan application 322, including a URL of an access destination, query information, header information, and an application ID (application identifier) of a request source.

In step S705, the web browser 324 determines whether the request received in step S703 is a screen display request, based on the analysis result. In this case, the request received from the scan application 322 is an authentication request but not a screen display request, and thus the processing proceeds to step S720. For example, because, in a case where the authentication request is received, the header information included in the request information includes an authentication request header field, it can be determined that the received request is an authentication request, in a case where the header information includes an authentication request header field, and it can be determined that the received request is the screen display request, in a case where the header information does not include an authentication request header field. This request determination method is merely an example. A type of each request can be determined based on a URL or query information. In a case where the scan execution button 518 is pressed on the scan execution screen 510, it is determined that the screen display request is received (YES in step S705), and the processing proceeds to step S706.

In step S720, the web browser 324 determines whether the request received in S703 is the authentication request. In a case where the request received from the scan application 322 is the authentication request (YES in step S720), the processing proceeds to step S721. In a case of, in step S720, exceptional processing in which the web browser 324 receives, from the application 309, a request that is neither the screen display request nor the authentication request (NO in step S720), the processing proceeds to step S728. In step S728, the web browser 324 transmits a request to the web engine A 325. In step S729, the web engine A 325 sends a response to the request to the web browser 324, and the processing is terminated.

In step S721, the web browser 324 transmits the authentication request to the web engine B 326 that is a new web engine. This is because the server 103 that is a cloud server configured to perform authentication uses new web technology in many cases and thus it is highly likely that an error may occur in authentication processing without using a new web engine. While the present exemplary embodiment illustrates an example where the web engine B 326 is consistently used to perform processing every time an authentication request is received, the present exemplary embodiment is not limited to this example. For example, the web engine B 326 can be used to perform processing only in a case where the authentication request header field is analyzed and it is determined that a predetermined authentication request is received. An example of the predetermined authentication request is an authentication request based on new specifications, such as OAuth 2.0.

In step S722, the web engine B 326 acquires URL information, query information, and the like included in the request information.

In step S723, the web engine B 326 transmits the authentication request to the acquired URL using authentication information (user ID, password) included in the query information.

In step S724, the web engine B 326, which is a new web engine, receives a response to the authentication request from the server 102.

In step S725, the web engine B 326, which is a new web engine, determines whether the authentication is successful, based on the authentication response received from the server 103. In a case where the authentication is successful (YES in step S725), the processing proceeds to step S726. In a case where the authentication is unsuccessful (NO in step S725), the processing proceeds to step S727.

In step S726, the web engine B 326, which is a new web engine, returns an authentication code received from the server 103 that has been successful in the authentication, as a response to the scan application 322. Using the authentication code enables the scan application 322 to obtain an authority to store electronic data generated by scanning into the server 103.

In step S727, the web engine B 326 returns an authentication error code received from the server 103 that has failed in the authentication, as a response to the scan application 322. The scan application 322 notifies the user of a notification indicating a message based on an authentication error, such as an unauthorized use of a password.

According to the above-described exemplary embodiment, since a new web engine can be used when the authentication request is issued, authentication can be executed without an error.

In a case where the image forming apparatus 101 displays a screen on the web browser 324, if the web engine A 325 that has been installed and conventionally used on the image forming apparatus 101 is used to display the screen, a web content created using new web technology cannot be appropriately displayed in some cases. To utilize new web technology, the user may install the web engine B 326 as a new web engine on the image forming apparatus 101 on which the web engine A 325 has been used, and may consistently use the web engine B 326 as a new web engine to display screens. In such cases, display compatibility between the web engine B 326, which is a new web engine, and the web engine A 325 cannot be maintained, and consequently, applications that have used cannot be displayed in the same manner as before, or cannot be displayed like in the display performed using the web engine A 325, which may confuse the user. Thus, a description will be given of a configuration for switching the web engine A 325 and the web engine B 326 to be used based on an application to be executed.

<Print Application Screen>

FIG. 6A illustrates a print queue display screen 600 for the print application 323 that is displayed in response to pressing performed on the print icon 502. The print queue display screen 600 is a screen that is displayed using the web engine A 325. FIG. 6A illustrates an example of a screen that is displayed when the user with the user name "Sato" is logged in.

A screen content of the print application 323 is composed of HTML/CSS data. The print application 323 displays a screen by sending HTML/CSS data held in the print application 323 and a display request to the web browser 324.

The user checks a list of print jobs input to the image forming apparatus 101 on the print queue display screen 600 using a printer driver from a personal computer (PC) or the like.

A job name row 611 indicates a job name of each print job input by the user. A file name on the PC is basically applied.

A color setting row 612 indicates a color setting for each print job. The user can select a color setting from among AUTO, black-and-white (BW), and color (CL).

A number-of-copies setting row 614 indicates a setting for the number of copies in each print job. The user can set the number of copies of a target print material.

Print jobs 615 and 616 are print jobs that are stored in the HDD 214 of the image forming apparatus 101 and are associated with the user name "Sato". In FIG. 6A, the two print jobs 615 and 616 are displayed on the print queue display screen 600, and a state where the user has selected the print job 615 is illustrated.

A print execution button 617 is a button to start execution of printing for the print job selected by the user. When the user presses the print execution button 617, the selected print job 615 is output onto paper by the image forming apparatus 101.

A delete execution button 618 is a button to start execution of deletion of the print job selected by the user. When the user presses the delete execution button 618, the selected print job 615 is deleted from the image forming apparatus 101.

A cancel button 619 is a button for the user to cancel displaying of the print queue display screen 600. When the user presses the cancel button 619, the print queue display is cancelled and then the screen returns to the top menu screen 500.

FIG. 6B illustrates the print queue display screen 600 for the print application 323 that is displayed when the print icon 502 is pressed. Each item indicating the screen that is displayed using the web engine B 326 is similar to that illustrated in FIG. 6A, and thus the redundant description is omitted.

FIGS. 6C and 6D each illustrate a part of the screen content composed of HTML/CSS data held in the print application 323.

The print application 323 displays a screen by sending HTML/CSS data held in the print application 323 and a display request to the web browser 324.

A checkbox 630 is a representation example of HTML data on a checkbox indicating a state where the user has selected the checkbox in a print job. A display content to be displayed as a result of rendering HTML data depends on which one of the web engine A 325 and the web engine B 326 is used for rendering.

In a case where the checkbox 630 is rendered by the web engine A 325, checkboxes corresponding to print jobs 615 and 616, respectively, are displayed on the print queue display screen 600.

On the other hand, in a case where the checkbox 630 is rendered by the web engine B 326, which is a new web engine, checkboxes corresponding to print jobs 625 and 626, respectively, are displayed on a print queue display screen 620. That is, the checkbox 630 displayed when the web engine A 325 is used is different from the checkbox 630 displayed when the web engine B 326 is used.

A select list 640 is a representation example of HTML data for use in displaying and selecting a list of candidates for print settings in a print job. A display content that is displayed as a result of rendering HTML data depends on which one of the web engine A 325 and the web engine B 326 is used for rendering.

If the select list 640 is rendered by the web engine A 325, the color setting row 612 is displayed as a select list for each print job on the print queue display screen 600.

The user can select a color setting from among BW, CL, and AUTO.

On the other hand, in a case where the select list 640 is rendered by the web engine B 326, which is a new web engine, the color setting row 612 is displayed as a select list for each print job on the print queue display screen 620. The user can select a color setting from among BW, CL, and AUTO. Thus, even if the same web content is displayed using different browser engines, the display content varies. If the user who has usually used the print application 323, i.e., the user who has been provided with the print queue display screen 600, is provided with the print queue display screen 620 due to installation of the web engine B 326 as a new web engine, the web content cannot be displayed in the same manner as before, which can confuse the user. Thus, even when the web engine B 326 is installed as a new web engine, the applications that have been installed and conventionally used are displayed using the web engine A 325.

FIG. 6E illustrates a screen 650 for the new print application 321 that is displayed in response to pressing performed on the new print icon 503. The screen 650 is a screen to be displayed using the web engine B. The screen 650 is an example of a screen that is displayed when the user with the user name "Sato" is logged in. The screen content of the new print application 321 is composed of HTML/CSS data, and the new print application 321 displays the screen by sending HTML/CSS data held in the print application 323 and a display request to the web browser 324. HTML/CSS data and the like to be displayed in the new print application 321 are created using new web technology, and thus cannot be appropriately displayed in some cases without using a new web engine. Thus, the screen for the new print application 321 is displayed using the web engine B 326.

<Web Content Display Processing>

Processing in which the web browser 324 that operates on the image forming apparatus 101 according to the present exemplary embodiment displays a screen based on a screen display request from the print application 323 or the new print application 321 will be described with reference to the flowchart illustrated in FIG. 7. Each step in the flowchart illustrated in FIG. 7 is executed by the CPU 211 of the image forming apparatus 101 loading control programs stored in a memory such as the ROM 212 into the RAM 213 and executing the control programs.

In step S701, the web browser 324 is started at power-on of the image forming apparatus 101.

In step S702, the web browser 324 transitions to a standby state to wait for a request from the application 309.

In step S703, the web browser 324 receives a request from the application 309 that runs on the image forming apparatus 101. A description will be given of a case where a request is received from the print application 323 or the new print application 321.

In step S704, the web browser 324 analyzes the received request. Specifically, the web browser 324 analyzes request information including a URL of an access destination, query information, header information, and an application ID of a request source.

In step S705, the web browser 324 determines whether the request received in step S703 is a screen display request, based on the analysis result. In this case, the header information in the request information received from the print application 323 or the new print application 321 does not include an authentication request header field. Accordingly, the web browser 324 determines that a screen display request is received (YES in step S705), and then the processing proceeds to step S706.

In step S706, the web browser 324 acquires the application ID included in the request from the print application 323 or the new print application 321.

In step S707, the web browser 324 analyzes the acquired application ID, and uniquely identifies the application that has sent the request.

In step S708, the web browser 324 determines whether the application that has sent the request satisfies a predetermined condition. In a case where the application satisfies the predetermined condition (YES in step S708), the processing proceeds to step S709. In a case where the application does not satisfy the predetermined condition (NO in step S708), the processing proceeds to step S710. An example of the application that satisfies the predetermined condition is an application that has been installed on the image forming apparatus 101 and has been released in the market. A list of application IDs corresponding to such applications is preliminarily held as table information. In a case where the acquired application ID is included in the table information, the processing proceeds to step S709, and in a case where the acquired application ID is not included in the table information, the processing proceeds to S710.

In a case where the print application 323 has sent the request, the processing proceeds to step S709, and in a case where the new print application 321 has sent the request, the processing proceeds to S710.

In step S709, the web browser 324 transmits a page display request to the web engine A 325 that has been installed and conventionally used.

In step S710, the web browser 324 transmits the page display request to the web engine B 326 that is a new web engine.

In step S711, the engine received the request which is the web engine A 325 or the web engine B 326 acquire URL information included in the request transmitted from the corresponding application which is the print application 323 or the new print application 321. Because the web contents for displaying screens for the print application 323 or the new print application 321 are stored in the ROM 212 or the like of the image forming apparatus 101, a URL is, for example, "file:/rom/print-application/dialog/index.html".

In step S712, the web engine A 325 or the web engine B 326 acquires a web content from the acquired URL information.

In step S714, the web engine A 325 or the web engine B 326 determines whether the acquisition of the web content is successful. In a case where the acquisition of the web content is successful (YES in step S714), the processing proceeds to step S715. In step S715, the acquired web content is rendered. In a case where the acquisition of the web content is unsuccessful (NO in step S714), the processing proceeds to step S717. In step S717, an error code is returned as a response to the print application 323 or the new print application 321.

In step S716, the web engine A 325 or the web engine B 326 displays the rendering result on the operation unit 219 of the image forming apparatus 101, and sends a response indicating that the screen is successfully displayed to the print application 323 or the new print application 321.

According to the exemplary embodiment described above, even in a case where a new web engine is installed, applications that have using a conventional web engine continuously use the conventional web engine, whereby a screen can be displayed in the same manner as before. On the other hand, in the case of executing a new application, using a new web engine that supports new web technology allows screen display to be appropriately performed. Further, in a case where new application to be used, there is no need to take into consideration the display content familiar to the user, and thus the use of a new web engine raises no problem.

While the present exemplary embodiment illustrates an example where a web content to be displayed is stored in the image forming apparatus 101, the method for obtaining a web content is not limited to this example. The web content can be acquired in each processing from external servers, such as the servers 102 to 104. The scan application 322 sends an authentication request using the web engine B 326. However, in the case of screen display, the scan application 322 can use the web engine A 325.

Other Exemplary Embodiments

In the above-described exemplary embodiments, different browser engines in a web browser are used based on the content of request information for the web browser, but instead different web browsers can be used in accordance with the content of request information.

In the above-described exemplary embodiments, the web engine to be used is changed based on the content of request information. Alternatively, the web engine to be used can be fixed and another web engine can be used only when an error has occurred. For example, the web engine A 325 can be set as the web engine to be used in default and the web engine B 326 can be used only when a processing error (e.g., an error in authentication processing) has occurred in the web engine A 325. More alternatively, the web engine to be used can be fixed and another web engine can be used only when a button to use another web engine is selected by the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-139941, filed Aug. 30, 2021, which is hereby incorporated by reference herein in its entirety.

What is claimed is:

1. An information processing apparatus including a web browser that is configured to operate on the information processing apparatus and includes a plurality of web engines, the information processing apparatus comprising:
    a memory; and
    at least one processor in communication with the memory, wherein the at least one processor of the information processing apparatus is configured to perform:
    receiving a request for processing on the web browser; and
    determining which one of the plurality of web engines is to be used to execute the processing, based on a content of request information corresponding to the received request,
    wherein, in a case where the web browser displays a screen, the determining performs determination of which one of the plurality of web engines is to be used to execute the processing, based on an application that has sent the received request.

2. The information processing apparatus according to claim 1, wherein the request information includes at least one of header information, a uniform resource locator (URL), query information, and an identifier of a request source application.

3. The information processing apparatus according to claim 1, wherein the determining performs determination of which one of the plurality of web engines is to be used to execute the processing, based on header information included in the request information.

4. The information processing apparatus according to claim 1, wherein the determining performs determination of which one of the plurality of web engines is to be used to execute the processing, based on an identifier of a request source application included in the request information.

5. The information processing apparatus according to claim 1, wherein the plurality of web engines includes at least a first web engine and a second web engine, and installation of the second web engine on the information processing apparatus has been performed at a later time after installation of the first web engine on the information processing apparatus.

6. The information processing apparatus according to claim 5, wherein the first web engine and the second web engine are different versions of web engines of a same type.

7. The information processing apparatus according to claim 5, wherein the determining performs, in a case where the received request is an authentication request, determination to execute the processing using the second web engine.

8. The information processing apparatus according to claim 5, wherein the determining performs, in a case where the application that has sent the received request satisfies a predetermined condition, determination to execute the processing using the first web engine.

9. The information processing apparatus according to claim 1, wherein each of the plurality of web engines is a hypertext markup language (HTML) rendering engine.

10. The information processing apparatus according to claim 1, wherein the information processing apparatus is an image forming apparatus including at least one of a print function and a scan function.

11. The information processing apparatus according to claim 1, wherein the receiving receives a request for executing a print function on the web browser.

12. The information processing apparatus according to claim 1, wherein, even in a case where a request source that has sent the received request is a same application, the determining changes determination of which one of the plurality of web engines is to be used to execute the processing, based on the content of the request information.

13. A control method for an information processing apparatus including a web browser that is configured to operate on the information processing apparatus and includes a plurality of web engines, the control method comprising:
    receiving a request for processing on the web browser; and
    determining which one of the plurality of web engines is to be used to execute the processing, based on a content of request information corresponding to the received request,
    wherein, in a case where the web browser displays a screen, the determining performs determination of which one of the plurality of web engines is to be used to execute the processing, based on an application that has sent the received request.

14. A non-transitory computer-readable storage medium storing a program to cause a computer to perform a method for an information processing apparatus including a web browser that is configured to operate on the information processing apparatus and includes a plurality of web engines, the method comprising:
    receiving a request for processing on the web browser; and
    determining which one of the plurality of web engines is to be used to execute the processing, based on a content of request information corresponding to the received request,
    wherein, in a case where the web browser displays a screen, the determining performs determination of which one of the plurality of web engines is to be used to execute the processing, based on an application that has sent the received request.

* * * * *